(12) United States Patent
Obertegger

(10) Patent No.: US 6,879,371 B2
(45) Date of Patent: Apr. 12, 2005

(54) DEVICE AND METHOD FOR ILLUMINATING, DEVELOPING AND CUTTING PHOTOGRAPHIC MATERIAL IN THE FORM OF A ROLL

(75) Inventor: Franz Obertegger, Brixen (IT)

(73) Assignee: Durst Phototechnik-AG, Brixen (IT)

( * ) Notice: Subject to any disclaimer, the term of this patent is extended or adjusted under 35 U.S.C. 154(b) by 0 days.

(21) Appl. No.: 10/380,560

(22) PCT Filed: Dec. 29, 2000

(86) PCT No.: PCT/EP00/13332

§ 371 (c)(1),
(2), (4) Date: Aug. 6, 2003

(87) PCT Pub. No.: WO02/23266

PCT Pub. Date: Mar. 21, 2002

(65) Prior Publication Data

US 2004/0041991 A1 Mar. 4, 2004

(30) Foreign Application Priority Data

Sep. 15, 2000 (IT) ..................................... BZ2000A0040

(51) Int. Cl.⁷ ......................... G03B 27/00; G03B 27/32; G03B 27/52
(52) U.S. Cl. .............................. 355/29; 355/27; 355/40
(58) Field of Search .............................. 355/27–29, 40, 355/407; 396/611–612

(56) References Cited

U.S. PATENT DOCUMENTS

| | | | |
|---|---|---|---|
| 4,260,234 A | | 4/1981 | Burton |
| 5,339,130 A | * | 8/1994 | Landis ........................ 396/612 |
| 5,791,221 A | * | 8/1998 | Krupica et al. ............... 83/367 |
| 5,978,555 A | * | 11/1999 | Inoue .......................... 358/1.9 |
| 6,108,070 A | | 8/2000 | Morita |
| 6,219,128 B1 | * | 4/2001 | Denawa et al. ............... 355/27 |

FOREIGN PATENT DOCUMENTS

EP        0 638 839        2/1995

* cited by examiner

Primary Examiner—Henry Hung Nguyen
(74) Attorney, Agent, or Firm—Collard & Roe, P.C.

(57) ABSTRACT

A device for exposing, developing and cutting reeled photographic material comprises an exposure unit, a cutting unit and a developer unit, and transport mechanisms associated therewith and operable to transport the reeled photographic material or to hold it stationary. A first buffer container is disposed between the exposure and cutting units and a second buffer container is disposed between the cutting and developer units. The buffer containers have flaps for selectively closing and opening the buffer containers whereby the reeled photographic material may be transported above them when they are closed and buffered therein when they are open.

8 Claims, 1 Drawing Sheet

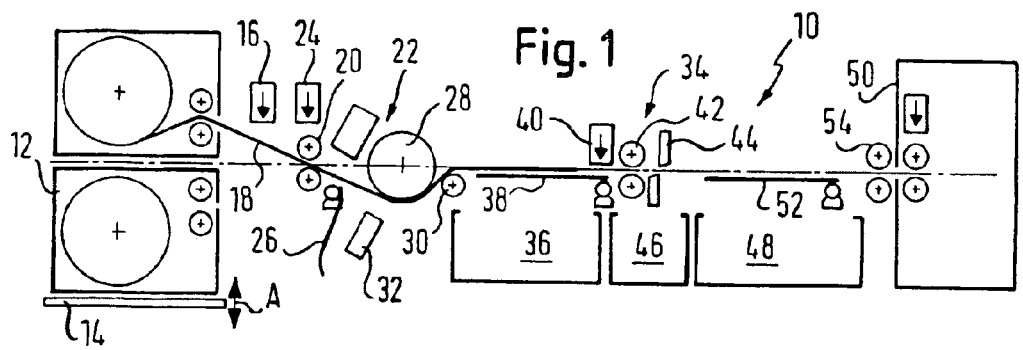
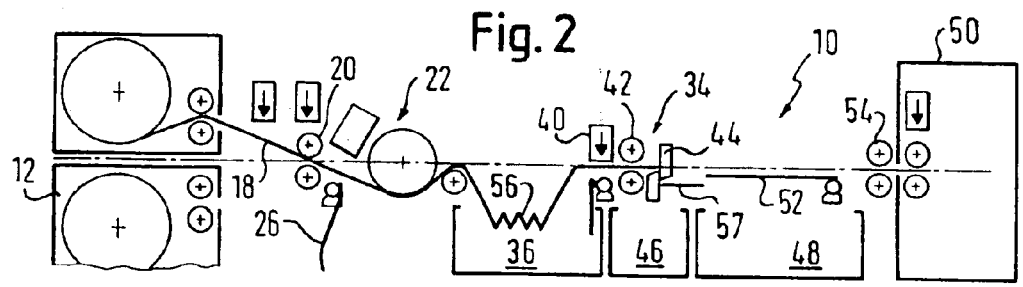
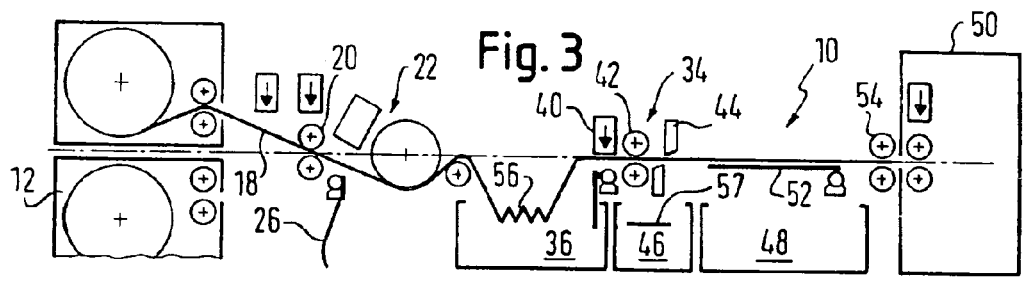
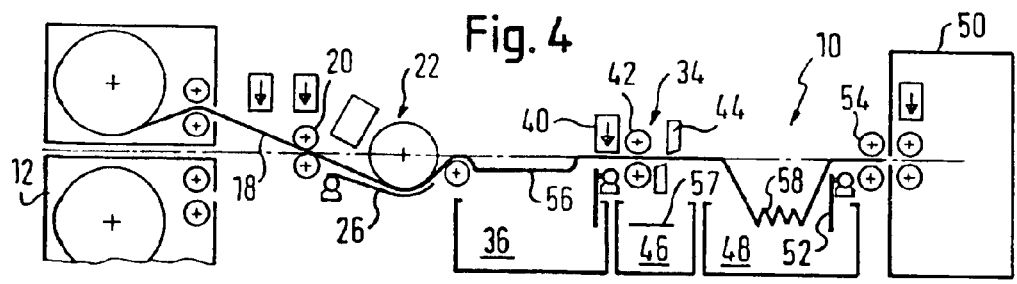
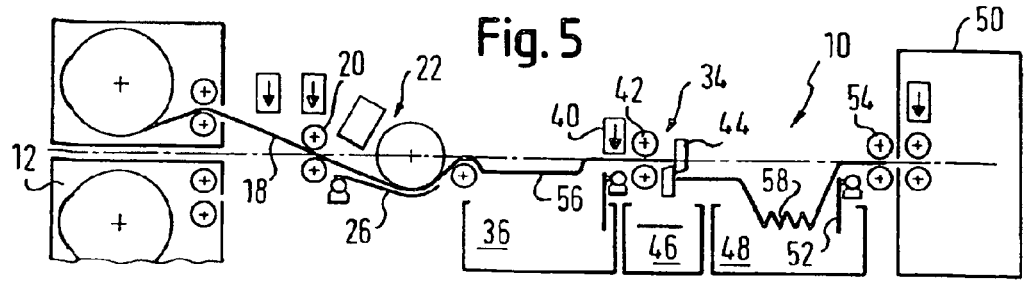

DEVICE AND METHOD FOR ILLUMINATING, DEVELOPING AND CUTTING PHOTOGRAPHIC MATERIAL IN THE FORM OF A ROLL

CROSS REFERENCE TO RELATED APPLICATIONS

Applicant claims priority under 35 U.S.C. §119 of Italian Application No. BZ2000A000040 filed Sep. 15, 2000. Applicant also claims priority under 35 U.S.C. §365 of PCT/EP00/13332 filed Dec. 29, 2000. The international application under PCT article 21 (2) was not published in English.

TECHNICAL BACKGROUND

The invention relates to a device and a method for exposing, developing and cutting photographic reeled material.

In the photographic industry, photographic paper, which may be supplied in reeled format, is exposed using a film that has been exposed in a camera and the exposed photographic paper is developed, dried and cut into individual photographs. The cutting step may also take place before developing. In order to automate machines of this type to a greater degree and thereby increase their productivity, it is necessary to provide as many automated elements as possible in such a machine in order to automate operation as far as possible. It is also becoming increasingly common for the exposed and developed photographic reeled material to be cut into individual photographs of different formats or alternatively in longer strips. In doing this, care needs to be taken to ensure that the region in which the photographic paper is exposed is subjected to as few shocks as possible in order to ensure precise exposure of the photographic material.

THE PRIOR ART

Amongst the existing systems, automated photographic laboratories are known, which unreel photographic reeled material from a roll, expose it, cut it into individual photographs and develop it. However, these systems are usually limited to processing quite specific formats and can only be adjusted to handle limited sizes/formats.

DESCRIPTION OF THE INVENTION

The underlying objective of the invention is to propose a device and a method for exposing, cutting and developing photographic reeled material, offering a higher degree of automation, flexibility in terms of formats handled and a higher throughput rate, which will enable the photographic reeled material to be continuously exposed without disruption due to external influences and whereby different settings may be applied purely on the basis of software and sensors to enable the photographic reeled material to be cut to different lengths with very little paper loss in a particularly simple manner.

This objective is achieved with a device for exposing, developing and cutting reeled photographic material, comprising an exposure unit and a transport mechanism associated therewith, and a cutting unit and a transport mechanism associated therewith and operable to transport the reeled photographic material or to hold it stationary. A first buffer container is disposed between the exposure unit and the cutting unit, the first buffer container having means for selectively closing and opening the first buffer container whereby the reeled photographic material may be transported above the first buffer container when it is closed and buffered therein when it is open. The device further comprises a developer unit and a transport mechanism associated therewith and operable to transport the reeled photographic material or to hold it stationary, and a second buffer container disposed between the cutting unit and the developer unit. The second buffer container also has means for selectively closing and opening the second buffer container whereby the reeled photographic material may be transported above the second buffer container when it is closed and buffered therein when it is open.

Accordingly, the device proposed by the invention has an exposure unit with an associated transport mechanism, a cutting unit with an associated fixable transport mechanism and a developer unit with an associated, fixable transport mechanism. The individual units are provided as a means of implementing the steps described above. Each of the units has a transport mechanism in order to transport the reeled material through this unit and on to the next unit. The transport mechanism of the cutting unit can be fixed in order to immobilise and cut the reeled material at an appropriate point and cuts it after feeding it along extremely quickly by an accurately adjustable length. The transport unit co-operating with the developer unit can also be fixed in order to ensure a defined forward feed into the developer unit, which will be described in more detail below, and in particular to enable a piece of reeled material cut in any length to be fed into the developer unit as one piece.

The device proposed by the invention is suitable for exposing, cutting and developing individual, relatively short photographs but, because of the features to be described in more detail below, it is also suitable for exposing, cutting and developing longer strips of photographic paper, which can be exposed using an entire film, for example, and thus be several metres in length, and in a preferred embodiment up to five metres in length. The device proposed by the invention has this flexibility due to the fact that a respective buffer container is provided between the exposure and cutting units and between the cutting and developer units, which can be closed and opened. In the closed state, a leading edge of the reeled material can be fed above the closed container to the next respective unit. This will be the case, for example, when transporting the leading edge of a new roll of photographic paper between the exposure unit and the cutting unit. In the preferred situation where the cutting unit is disposed before the developer unit, the leading edge of a new photograph or a new exposed length of the reeled material resulting when a preceding section has been cut, must be transported from the cutting unit to the developer unit. The system is also always operated in the closed state, whenever (in all situations where) the paper format is so big that the paper to be exposed has already been separated from the cut paper.

The buffer containers can also be opened so that the reeled material can advantageously be buffered, which also makes the device proposed by the invention suitable for exposing and developing longer sections of reeled material without compromising the exposure quality, i.e. exposure, cutting, transport, development can be operated in a continuous process without stopping the exposed photographic paper and without interrupting exposure. In particular, the leading edge of the reeled material is immobilised at the cutting unit by means of the associated fixable transport mechanism whenever a cutting process is to be operated and the exposure can advantageously continue, enabling exposure to proceed uninterrupted. Accordingly, the transport mechanism associated with the exposure unit continues to feed the reeled material so that a buffer loop accumulates between the exposure unit and the cutting unit. This loop advantageously provides a mechanical decoupling between the reeled material immobilised at the cutting unit and the section of reeled material exposed and fed through the exposure unit. In other words, exposure may continue in the exposure unit without the cutting unit or a transport mechanism operating the feed to the cutting unit causing any tension on the reeled material, which would have a detrimental effect on the exposure quality.

The second buffer container provided between the cutting unit and the developer unit likewise provides a decoupling effect between cutting unit and developer unit. Specifically, once the leading edge of a specific length of the reeled material has been cut in a defined manner, the reeled material is not fed forwards by the transport mechanism of the cutting unit until there is enough reeled material in the first buffer container to allow the reeled material to be fed to the transport mechanism of the developer unit without tension. This process is then handled by means of the closed, second buffer container and an immobilisation operation takes place at the transport mechanism of the developer unit. Whilst the exposure process can be continuously operated in the exposure unit, the reeled material accumulated in the first buffer container for buffering purposes will continue to be reeled into the second buffer container until the end of a section of the reeled material which has to be cut is reached, and this may be marked by an appropriate cut marker which can be detected by a cut marker sensor of the cutting unit. During this process, the transport mechanism of the developer unit does not apply any tension when drawing the material out of the transport mechanism of the cutting unit nor does the latter apply any tension when drawing the reeled material out of the exposure unit.

This tension-free operating mode guarantees good (vibration-free) and continuous exposure quality. As the end of a section to be cut arrives, the cutting unit applies a cut and the separated section can be fed on to the developer unit. As soon as the buffer container co-operating with the cutting unit has been emptied in this manner, the beginning of the next section is fed from the cutting unit to the developer unit, usually with the second buffer container closed. The procedure described above is then repeated.

As explained above, the device proposed by the invention may expose, cut and develop a longer length of photographic reeled material continuously without interrupting the transported medium and exposure process and without placing the exposure quality at risk. However, the device proposed by the invention is also capable of exposing, developing and cutting individual short photographs in the same way and does not require any additional equipment to do so. In this situation, the start of the photograph is cut at a defined point, the reeled material is fed on until the start of the photograph can be immobilised at the developer unit and the photograph end is then cut. The cut photograph is fed into the developer unit, where it is developed and dried. The same procedure is then repeated for a photograph immediately behind which has to be exposed. If the end of a film that was used to expose the photographic material is reached, the reeled material can be wound back so that exposure using another film can be continued at the leading edge of the reeled material with as little waste as possible.

It has proved to be of advantage to design the handling capacity of the first and/or second buffer container to take five metres of reeled material. With this length, complete films of standard sizes can be exposed on a continuous strip of an appropriate length of photographic reeled material and cut off at this length.

An opening and closing flap has proved to be a particularly effective means of closing off the first and/or second buffer container.

As mentioned above, the cutting unit of the device proposed by the invention may be automated and a cut marker printing device is provided on the exposure unit, which applies cut markers in the area of the exposed sections indicating the start of a photograph and the end of a photograph. In order to make a cut at the appropriate point, a cut marker sensor is provided on the cutting unit, which detects said cut markers and generates a signal, which is forwarded to the cutting unit so that a cut can be made at the corresponding point.

Finally, advantages are to be had if the cutting unit has a dual-cut cutting mechanism. Accordingly, the unexposed space between two photographs can be separated in a single process sequence. Consequently there is no need to cut the end of a first photograph and the start of a second photograph separately in order to split off the unexposed intermediate section. Instead, the unexposed strip is removed by a cutting operation which takes place in a single step.

The objective outlined above is also achieved by the method of exposing, developing and cutting a reeled photographic material, which comprises transporting the reeled photographic material to an exposure unit, transporting the reeled photographic material from the exposure unit to a cutting unit, and selectively opening and closing a first buffer container disposed between the exposure unit and the cutting unit whereby the reeled photographic material is transported above the first buffer container when it is closed and buffered therein when it is open. The reeled photographic material then transported to a developer unit, and a second buffer container disposed between the cutting unit and the developer unit is selectively opened and closed whereby the reeled photographic material is transported above the second buffer container when it is closed and buffered therein when it is open.

As explained above in connection with the device proposed by the invention, the new operating mode use for exposing, developing and cutting photographic reeled material operates on the basis of continuous exposure and continuous transportation of a reeled material to an exposure unit. At an appropriate point of the reeled material, the reeled material is then immobilised or fixed at a cutting unit and the invention proposes a buffer system for the reeled material between the cutting unit and exposure unit to allow continuous operation of the exposure unit, and these units are advantageously mechanically uncoupled from one another so that the material can be continuously fed tension-free, which avoids jeopardising the exposure quality. Accordingly, the reeled material is cut whilst exposure and buffering continue.

The reeled material is then transported to a developer unit, once the buffered length corresponds to or is greater than the distance between cutting and developer unit. The reeled material is then immobilised at the developer unit and is also buffered in advance of the developer unit. In order to separate a predetermined length from the reeled material, it is fed along and immobilised at a predetermined point alongside the cutting unit, cut and the separated length is then fed onto the developer unit. Finally, the reeled material continues to be fed to the developer once a buffer container arranged ahead of the developer unit has been emptied. In addition to exposing, developing and cutting individual short photographs, the method proposed by the invention requires no additional equipment in order to be able to expose, cut and develop long sections of photographic reeled material and because buffer systems are provided, the material can be fed without any tension and without causing jams, thereby ensuring uninterrupted exposure.

Advantageous embodiments of the method proposed by the invention are described in the other claims.

In order to ensure that the developer unit is always ready to receive a new length, the transport mechanism of the developer unit is operated at a higher speed than the transport mechanism at the exposure unit. This ensures fault-free operation.

The method proposed by the invention offers advantages in terms of flexibility if the buffer containers provided are open when buffering is taking place and closed when a leading edge of the reeled material has to be transported to a subsequent unit.

As explained in connection with the device proposed by the invention, advantages are also to be had in terms of automating the method proposed by the invention if cut markers are applied at the exposure unit and the cut markers are detected at the cutting unit to enable the beginning and the end of a photograph or a length to be automatically detected and a cut applied accordingly.

BRIEF DESCRIPTION OF THE DRAWINGS

An example of an embodiment of the invention will be explained in more detail below with reference to the appended drawings. Of these:

FIG. 1 is a schematic diagram of the device proposed by the invention, in the process of exposing reeled material;

FIG. 2 is a schematic diagram of the device proposed by the invention in the process of buffering reeled material;

FIG. 3 is a schematic diagram of the device proposed by the invention in the process of feeding the reeled material on to a developer unit;

FIG. 4 is a schematic diagram of the device proposed by the invention in the process of operating a second buffer system;

FIG. 5 is a schematic diagram of the device proposed by the invention in the process of cutting a photograph end.

DETAILED DESCRIPTION OF A PREFERRED EMBODIMENT OF THE INVENTION

It should firstly be pointed out that the preferred embodiment of the device 10 proposed by the invention has numerous features and aspects, all of which are necessary to achieve the objective of the invention, namely providing a device that is reliable and versatile, and these should therefore be construed as forming part of the invention. Specifically, the device 10 proposed by the invention has, in the direction in which the material is transported, in other words from left to right of the drawings, firstly a guide track 14 for a bottom paper cassette 12, the operating height of which can be adjusted in the direction of arrow A, and in particular which can be adjusted automatically or can be switched by means of appropriate paper guides. Particularly efficient operation can be achieved if facilities are provided for two cassettes of photographic reeled material, as illustrated in FIG. 1, which will enable a cassette to be changed very quickly. Immediately downstream of the paper cassette is a traction sensor 16 (this sensor will not necessarily be required if the mechanical uncoupling will suffice even without a loop), which detects the state of the material reeled off from the reeled material 18 between the cassette and the transport mechanism 20 of an exposure unit 22 in order to guarantee a certain buffer loop in this region and prevent any vibrations from being transmitted to the exposure unit 22. Also located in this region is a paper end sensor 24, which detects the end of the reeled material.

Said transport mechanism 20 of the exposure unit 22 consists of two rolls, which may be operated as brake rolls. An insertion guide 26 is provided, folded down in the diagrams shown in the drawings, to facilitate the process of feeding the reeled material along an exposure drum 28 of the exposure unit 22. Reference 30 denotes a pressing roll. Finally, in the region of the exposure unit 22, a cut marker printing device 32 is provided, which applies cut markers to the reeled material based on the exposure of the reeled material 18. The photographic reeled material is exposed by means provided on the exposure drum 28, not illustrated. Disposed between the exposure unit 22 and the cutting unit 34 is a first buffer and catchment container 36, which can be closed and opened by a schematically indicated flap 38. A cut marker sensor 40 is provided on the cutting unit 34 in order to detect the cut markers previously applied by the cut marker printing device 32. A transport mechanism 42 of the cutting unit 34 in the form of two rolls between which the reeled material 18 is fed, can be fixed, in other words the reeled material can be immobilised. Also indicated at the cutting unit 34 is the actual cutting mechanism 44, underneath which a waste container 46 is provided into which any cut sections which are not needed can drop.

A second buffer or catchment container 48 is disposed between the cutting unit 34 and a developer unit 50. The second buffer container 48 can also be closed and opened by means of a schematically indicated flap 52. Immediately ahead of the developer unit 50 is a fixable transport mechanism 54 which co-operates therewith, also consisting of two rolls. Other rolls may be provided between the rolls 30, 34 and 54 to facilitate the transfer through the buffer container.

The device illustrated in FIG. 1 can be operated to run the process of exposing, cutting and developing photographic reeled material of any length. FIG. 1 illustrates the situation in which the photographic reeled material has been fed by means of the insertion guide 26, which moves upwards for this purpose, along the exposure drum 28 and in particular onto the pressing roll 30. A process of uninterrupted exposure then takes place on the exposure drum 28. As a result of the loop in the region between paper cassette and exposure drum 28, detected by the sensor 16, the reeled material is fed tension-free. From the exposure unit 22, the leading edge of the reeled material is fed across the flap 38 of the first buffer container 36, which is closed in this instance, to the cutting unit 34. The sensor 40 detects a leading edge or beginning of a photograph and the reeled material is immobilised at an appropriate point by the fixable transport mechanism 42. Once immobilised, the ongoing exposure taking place at the exposure unit 22 causes the reeled material to be pushed to a certain degree into the first buffer container 36, where it is buffered.

This is illustrated in FIG. 2. It is specifically indicated by a buffer loop 56. During buffering, the exposure unit 22 continues its exposing process. As soon as the requisite mechanical decoupling is obtained between the exposure unit 22 and the cutting unit 34, the transport mechanism 42 of the cutting unit 34 starts feeding across a relatively short distance, which is therefore not likely to cause any disruption, until a beginning of a photograph arrives alongside the cutting mechanism 44, where it is cut. A length 58 cut off at the leading edge can then drop down into the waste container 46. It should be pointed out that a leader image is usually produced in front a first photograph on the subsequently cut length 58, which essentially contains nothing more than an appropriate cut marker. As soon as the beginning of a photograph has been cut at a defined point, the cutting unit starts feeding to the developer unit 50.

As indicated in FIG. 3, the flap 52 of the second buffer container 48 is closed for this purpose and the free leading edge of the reeled material can be fed across the closed flap. Since the exposure process can be continued at the exposure unit 22 at least up to the time when the leading edge arrives at the transport mechanism 54 of the developer unit 50, the buffer loop 56 essentially becomes no shorter.

As illustrated in FIG. 4, up to the point in time when a photograph end arrives alongside the cutting unit 34, optionally whilst the exposure process continues in the exposure unit 22, a transfer may take place from the first buffer container 36 into the second buffer container 48. As mentioned above, the exposure process may continue in this situation so that the buffer loop 56 does not necessarily become shorter. FIG. 4, however, illustrates a situation in which exposure was terminated, so that the reeled material is transported exclusively from the first buffer container into the second buffer container 48 and the buffer loop 56 does become correspondingly shorter. Whilst the buffering process in the second buffer container 48 continues, a buffer loop 58 forms in this container when the flap 52 of this container is opened. Meanwhile, the sensor 40 detects a photograph or length end and this is fed by the transport mechanism 42 of the cutting unit to the cutting mechanism 44 and immobilised as necessary.

FIG. 5 illustrates how the length end is cut by the cutting mechanism 44. The now separated length, substantially disposed in the second buffer container 48, is then transferred to the developer unit 50, where it is developed and dried. As soon as the second buffer container 48 is empty again, the next length, which in the meantime has been continuously exposed by the exposure unit 22, is then fed above the flap 52 of the second buffer container 48, which has been closed again, onto the transport mechanism 54 of the developer unit 50, and is separated and then developed in the same manner as the preceding length. If, at any time, no other exposed length is behind, the paper can be rewound so that a free leading edge of the reeled material is disposed in the region between the exposure drum 28 and the pressing roll 30, so that the next exposure can be initiated from this status. Due to the buffer systems provided and the mechanical uncoupling effect achieved as a result, the exposure process is guaranteed to operate free of impact, vibrations and interruptions. It should be pointed out that a two-sided printer (not illustrated) may also be provided in order to apply an order number, for example, to the other side of the photographic paper. This being the case, it is of advantage if the subsequent transport rolls have recesses, to avoid any smudging of the ink.

What is claimed is:

1. A device for exposing, developing and cutting reeled photographic material, comprising
   (a) an exposure unit and a transport mechanism associated therewith,
   (b) a cutting unit and a transport mechanism associated therewith and operable to transport the reeled photographic material or to hold it stationary,
   (c) a first buffer container disposed between the exposure unit and the cutting unit, the first buffer container having
      (1) means for selectively closing and opening the first buffer container whereby the reeled photographic material is transported above the first buffer container when it is closed and buffered therein when it is open,
   (d) a developer unit and a transport mechanism associated therewith and operable to transport the reeled photographic material or to hold it stationary, and
   (e) a second buffer container disposed between the cutting unit and the developer unit, the second buffer container having
      (1) means for selectively closing and opening the second buffer container whereby the reeled photographic material is transported above the second buffer container when it is closed and buffered therein when it is open.

2. The device of claim 1, wherein at least one of the buffer containers has a capacity of receiving several meters of the reeled photographic material.

3. The device of claim 1, wherein the means for selectively closing and opening at least one of the buffer containers is a flap.

4. The device of claim 1, wherein the exposure unit has a cut marker printing device and the cutting unit has a cut marker sensor.

5. The device of claim 1, wherein the cutting unit has a dual-cut cutting mechanism.

6. A method of exposing, developing and cutting a reeled photographic material, which comprises
   (a) transporting the reeled photographic material to an exposure unit,
   (b) transporting the reeled photographic material from the exposure unit to a cutting unit,
   (c) selectively opening and closing a first buffer container disposed between the exposure unit and the cutting unit whereby the reeled photographic material is transported above the first buffer container when it is closed and buffered therein when it is open,
   (d) transporting the reeled photographic material to a developer unit, and
   (e) selectively opening and closing a second buffer container disposed between the cutting unit and the developer unit whereby the reeled photographic material is transported above the second buffer container when it is closed and buffered therein when it is open.

7. The method of claim 6, wherein the reeled photographic material is transported to the developer unit at a higher speed than it is transported at the exposure unit.

8. The method of claim 6, wherein a cut marker is applied to the reeled photographic material at the exposure unit and is detected at the cutting unit.

* * * * *

UNITED STATES PATENT AND TRADEMARK OFFICE
CERTIFICATE OF CORRECTION

PATENT NO. : 6,879,371 B2
DATED : April 12, 2005
INVENTOR(S) : Obertegger

It is certified that error appears in the above-identified patent and that said Letters Patent is hereby corrected as shown below:

<u>Title page,</u>
Item [30], Foreign Application Priority Data, change to read as follows:
-- Sep. 15, 2000     (IT)……………...BZ2000A000040 --.

Signed and Sealed this

Seventh Day of June, 2005

JON W. DUDAS
*Director of the United States Patent and Trademark Office*